Figure 1:
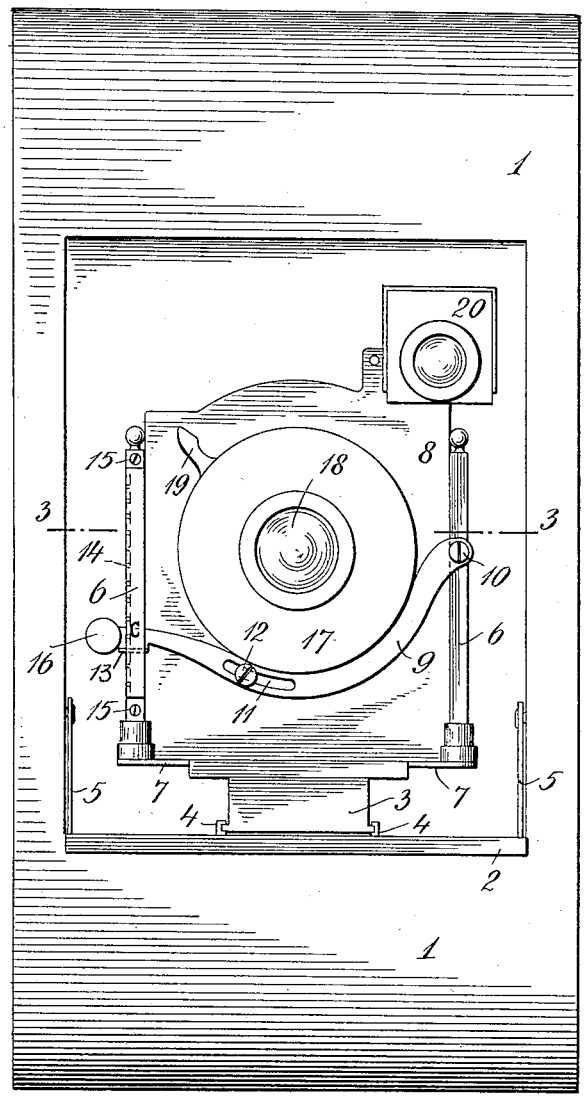

C. BORNMANN.
PHOTOGRAPHIC CAMERA.
APPLICATION FILED JAN. 12, 1912.

1,029,269.

Patented June 11, 1912.

Witnesses:
Max B. A. Doring
F. M. Donsbach

Inventor.
Carl Bornmann.
By his Attorney
Phillips Abbott.

COLUMBIA PLANOGRAPH CO., WASHINGTON, D. C.

UNITED STATES PATENT OFFICE.

CARL BORNMANN, OF BINGHAMTON, NEW YORK, ASSIGNOR TO ANSCO COMPANY, OF BINGHAMTON, NEW YORK.

PHOTOGRAPHIC CAMERA.

1,029,269.  Specification of Letters Patent.  Patented June 11, 1912.

Application filed January 12, 1912. Serial No. 670,911.

*To all whom it may concern:*

Be it known that I, CARL BORNMANN, a citizen of the United States, and a resident of the city of Binghamton, county of Broome, State of New York, have invented certain new and useful Improvements in Photographic Cameras, of which the following is a full, clear, and exact description.

It is the object of this invention to provide simple, inexpensive and quickly operated devices whereby the lens and coacting parts may be raised and lowered, as the operator may prefer, for more perfect attainment of the desired exposures.

I illustrate the invention as applied to a folding camera, but obviously it may be applied to cameras of other constructions.

In the drawings hereof I illustrate only such parts as are necessary or convenient for a full understanding of the invention.

Figure 2:
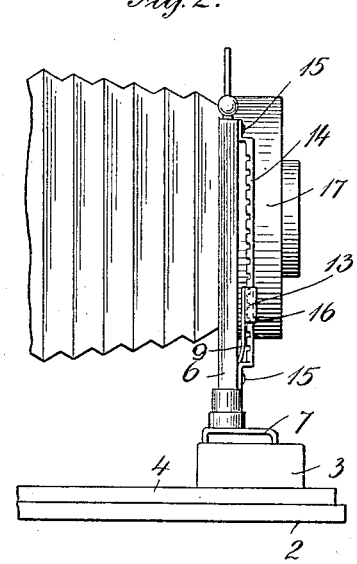
Figure 3:

In the drawings, Figure 1 illustrates an elevation of the front of a camera, with the front board lowered and showing an elevation of the invention; Fig. 2 illustrates a sidewise elevation of a part of the mechanism shown in Fig. 1; Fig. 3 illustrates a horizontal sectional view through the sliding lens frame on about the line 3—3 of Fig. 1.

Referring to the drawings, 1 represents the camera body, 2 the front board, 3 the sliding base for the lens frame, 4, 4, slideway bars upon which the base 3 moves and 5, 5, are braces for the front board.

The parts above referred to are or may be of any preferred construction.

6, 6, are two uprights supported upon a suitable crossbar 7, and having grooves cut in them respectively, within which the lateral edges of the base plate 8 which supports the lens mechanism slide vertically.

9 is a lever preferably curved as shown, which is pivoted at 10 to one of the uprights 6. It is provided with a slot 11 within which works a pin or screw 12 fastened in the plate 8. This lever is resilient and its spring action tends always to move it away from the plate 8, so that a tooth 13 made on the lever will engage in the detents of a rack bar 14 fastened by screws 15, or otherwise, to the upright 6 opposite that to which the lever is pivoted.

The rack bar incloses the resilient lever and therefore controls its spring action.

16 is a thumb piece for ease of manipulation or backward pressing of the free end of the lever 9.

17 is a metallic casing which incloses the shutter mechanism. 18 is the lens or cap therefor.

19 is a lever whereby the shutter mechanism is manipulated.

20 is a finder which may beneficially be connected to and moved with the supporting plate 8.

The operation is as follows: The parts will be in their normal position, that is to say, the lens will be in the focal center of the camera, when the lever 9 is in the position shown in Fig. 1, engaging with the rack 14 at the place indicated by the letter C in that figure and the parts will maintain this position during all ordinary exposures, but should the operator desire to alter the relation of the parts, he may quickly, accurately and smoothly shift the lens upwardly or downwardly by simply pressing upon the thumb piece 16, thus removing the tooth 13 of the lever 9 from the detent in the rack 14 in which it previously was engaged and then swinging the free end of the lever up or down, as desired, and permit the tooth 13 to enter such other detent in the rack 14 as may suit his purposes. During this movement by reason of the engagement of the pin or screw 12 in the slot 11 of the lever 9, the supporting plate 8 carrying the lens and shutter mechanism and the finder, if the finder is supported upon it, will be moved upwardly or downwardly as the case may be, the pin or screw 12 sliding to a greater or less extent through the slot 11.

It will be obvious to those who are familiar with this art that modifications may be made in the details of construction without departing from the essentials of the invention. I therefore do not limit myself to such details.

I claim:

1. The combination of a vertically movable lens supporting frame, supporting and guiding devices therefor, a lever pivoted at one end to one of the last-named devices, means at the other end of the lever supported by the opposite guiding device for holding the lever in predetermined positions, and means connecting the vertically movable lens frame with the lever.

2. The combination of a vertically movable lens-supporting frame, supporting and guiding devices therefor, a resilient lever pivoted at one end to one of said guiding devices, a rack at the other end of the lever supported by the opposite guiding device and which with its said support incloses the lever, and whereby the latter is held in predetermined positions, and means connecting the vertically movable lens frame with the lever.

3. The combination of a vertically movable lens supporting frame, uprights for supporting and guiding said frame located at opposite sides thereof, a lever pivoted at one end to one of the uprights, means upon the other upright, engageable with the free end of the lever to hold it in predetermined positions, and means connecting the vertically movable lens frame with the lever.

4. The combination of a vertically movable lens supporting frame, uprights for supporting and guiding said frame located at opposite sides thereof, a resilient lever pivoted at one end to one of the uprights, a rack on the opposite upright, which incloses the lever and with the several teeth of which the lever is adapted to engage, and means connecting the vertically movable lens frame with the lever.

In testimony whereof I have signed my name to this specification in the presence of two subscribing witnesses.

CARL BORNMANN.

Witnesses:
   GEO. W. TOPLIFF,
   H. P. MOXON.

---

Copies of this patent may be obtained for five cents each, by addressing the "Commissioner of Patents, Washington, D. C."